(12) United States Patent
Peterson et al.

(10) Patent No.: US 7,529,733 B2
(45) Date of Patent: May 5, 2009

(54) QUERY BUILDER USING CONTEXT SENSITIVE GRIDS

(75) Inventors: Trenten Peterson, Morgan Hill, CA (US); Hardeep Singh, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 10/985,431

(22) Filed: Nov. 10, 2004

(65) Prior Publication Data

US 2006/0101002 A1    May 11, 2006

(51) Int. Cl.
*G06F 7/00* (2006.01)
(52) U.S. Cl. .............................. 707/3; 707/102; 717/113
(58) Field of Classification Search .................. 707/4, 707/1, 3, 102; 717/113, 103, 109, 110, 112, 717/125
See application file for complete search history.

(56) References Cited

U.S. PATENT DOCUMENTS

| | | | |
|---|---|---|---|
| 5,418,950 A * | 5/1995 | Li et al. ......................... 707/4 |
| 5,619,688 A | 4/1997 | Bosworth et al. | |
| 5,798,757 A * | 8/1998 | Smith ......................... 715/709 |
| 5,828,376 A | 10/1998 | Solimene et al. | |
| 5,832,481 A * | 11/1998 | Sheffield ....................... 707/4 |
| 6,052,121 A | 4/2000 | Webster et al. | |
| 6,760,720 B1 | 7/2004 | De Bellis | |
| 6,836,857 B2 | 12/2004 | Ten-Hove et al. | |
| 6,871,204 B2 | 3/2005 | Krishnaprasad et al. | |
| 2001/0047372 A1 | 11/2001 | Gorelik et al. | |
| 2002/0059566 A1 | 5/2002 | Delcambre et al. | |
| 2003/0018644 A1* | 1/2003 | Bala et al. ................... 707/100 |
| 2003/0154191 A1 | 8/2003 | Fish et al. | |
| 2003/0212664 A1 | 11/2003 | Breining et al. | |
| 2004/0006765 A1* | 1/2004 | Goldman ..................... 717/116 |
| 2004/0068487 A1 | 4/2004 | Barton et al. | |
| 2004/0153995 A1* | 8/2004 | Polonovski .................. 717/113 |
| 2004/0167915 A1* | 8/2004 | Sundararajan et al. ....... 707/100 |
| 2004/0181543 A1 | 9/2004 | Wu et al. | |
| 2004/0193579 A1 | 9/2004 | Dettinger et al. | |
| 2004/0205577 A1 | 10/2004 | Abe et al. | |
| 2005/0015363 A1 | 1/2005 | Dessloch et al. | |
| 2005/0097084 A1 | 5/2005 | Balmin et al. | |
| 2005/0149343 A1 | 7/2005 | Rhoads et al. | |
| 2005/0165866 A1* | 7/2005 | Bohannon et al. ........... 707/203 |

(Continued)

OTHER PUBLICATIONS

David, "ANSI SQL Hierarchical Processing can fully Integrate Native XML," SIGMOD Record, v.32, n. 1, pp. 41-46, Mar. 2003.

(Continued)

*Primary Examiner*—Hosain T Alam
*Assistant Examiner*—Amy Ng
(74) *Attorney, Agent, or Firm*—Kali Law Group, P.C.

(57) ABSTRACT

A method for providing a query builder for at least one query language is disclosed. The method includes providing a plurality of grids and at least one resource for a grid set including at least one of the plurality of grids. The grids correspond to a plurality of functional units of the query language(s). The grid set corresponds to one of the functional units. The resource(s) correspond to the functional unit and to the grid set. The resource(s) are capable of being used as at least one argument for the grid set.

14 Claims, 4 Drawing Sheets

U.S. PATENT DOCUMENTS

| | | |
|---|---|---|
| 2005/0171976 A1 | 8/2005 | West et al. |
| 2005/0210002 A1 | 9/2005 | Pal et al. |
| 2005/0234680 A1 | 10/2005 | Dettinger et al. |
| 2005/0234889 A1 | 10/2005 | Fox et al. |
| 2005/0257201 A1 | 11/2005 | Rose et al. |
| 2005/0289125 A1 | 12/2005 | Liu et al. |

OTHER PUBLICATIONS

"Create XML Views of Relational Data using SQL/XML," printed from the following URL: http://www.stylusstudio.com/connect_for_sql_xml.html on Mar. 3, 2006.

Qu, "Integrating XQuery-Enabled SCORM XML Metadata Repositories into an RDF-Based ELearning P2P Network" Educational Technology &Society v.7 n.2 Apr. 2004.

Braga et al., "XQBE: A Graphical Interface for XQuery Engines," printed from the following URL: http://dbgroup.elet.polimi.it/xquery/papers/XQBE-EDBT04.pdf on Mar. 3, 2006.

Bemknopf, "Developing XML Applications using Oracle 9i's XML DB Facility," Technical Advantage Associates printed from the following URL: http://www.nyoug.org /200312bemknopf.pdf on Mar. 3, 2006.

Zhang et al., "Rainbow: Multi-XQuery Optimization Using Materialized XML Views," ACM, SIGMOD 2003 Jun. 9-12, 2003

Bhambhri, "Firing up the Hybrid Engine," DB2 Magazine, printed from the following URL: http://www.db2ma.com/shared/printableArticle:html?articleID=1671 00937 on Mar. 3, 2006.

"Way Adapter Manager," printed from the following URL: http ://www.iwaysoftware.com products/pdf/iAMfactsheet.pdf on Mar. 3, 2006.

Mangtani et al., "Liquid Data: XQuery-Based Enterprise Information Integration," BEA Systems, 2003,printed from URL: http://dev2dev.bea.com/pub/a/2004/11/Mangtani.html on Mar. 3, 2006.

"BEA AquaLogic Data Services Platform," BEA System Inc. 2005.

"DataMirror: Features and Benefits," printed from the following URL: "http ://www.datamirror.com/products/tserver/features.aspx" on Mar. 3, 2006.

SQL/XML in JDBC Applications, DataDirect Technologies, White Paper, Jun. 17, 2004.

* cited by examiner

QUERY BUILDER USING CONTEXT SENSITIVE GRIDS

FIELD OF THE INVENTION

The present invention relates to computer systems, and more particularly to a method and system for building queries.

BACKGROUND OF THE INVENTION

Data, such as extended markup language (XML) data in documents or data in relational databases, may be interrogated for various purposes using queries. Queries are formulated in a particular query language, such as XML Query Language (XQUERY) and structure query language (SQL). Queries typically include a set of conditions for determining which data to access. For example, such conditions might include if-then-else, for, concatenate, and return statements. Arguments for such functional statements might include various resources, such as particular data and other functional statements. Complex queries typically include multiple conditions designed to further specify the data interrogated. Based upon the conditions indicated in the query, appropriate information is accessed, returned, or otherwise manipulated.

To build a query without assistance, a user is generally required to posses detailed knowledge of the semantics and syntax of the query language. Thus, a user must understand the terms of the language, or semantics. Furthermore, the user must understand how to put the terms together, or syntax, for the language such that the query is understandable. Using this knowledge of term meanings (semantics) and syntax (how terms are related in building a particular query), a user may be able to formulate the desired query and access the data of interest.

To facilitate building of queries, various conventional tools are available. Conventional query builders, such as conventional SQL query builders, may be used in some instances. Such conventional query builders are particularly useful to novice users that have a limited knowledge of the semantics and/or syntax of the query language being used. However, more experienced users may also find the conventional query builder useful, particularly in formulating complex queries. For example, conventional SQL query builders may allow the user to formulate complex queries, containing multiple functional statements. Alternatively, conventional mapping tools might be used. Such conventional mapping tools allow the user to map the source XML to the expected output XML. The conventional mapping tool then generates the query without the user being explicitly aware of it Thus, a user might be able to formulate at least simple queries using such a mapping tools.

Although conventional query builders and mapping tools can be used, one of ordinary skill in the art will readily recognize that such conventional query builders and mapping tools have limited utility for certain scripting languages. Such scripting languages, including XML, are relatively complex. For example, such scripting languages may include logic and variable definitions that must be defined for complex queries. Most conventional query builders typically still require that the user understand the semantics of such query languages in order to build a complex query. Alternatively, other conventional query builders are capable of hiding the semantics of such query languages from a user. Typically, such conventional query builders view and represent only the complete query to the user. However, a user is also unable to create complex queries in such conventional query builders without greater knowledge of the semantics and/or syntax of the query language. Similarly, conventional mapping tools hide the logic and semantics of the query language, but do not allow users to create complex queries without a greater understanding of the semantics of the query language.

Accordingly, what is needed is a more flexible query builder that allows users to build complex queries with limited knowledge of the semantics of a query language, such as XQUERY. The present invention addresses such a need.

BRIEF SUMMARY OF THE INVENTION

The present invention provides a method and system for providing a query builder for at least one query language. The method and system comprise providing a plurality of grids and at least one resource for a grid set of the plurality of grids. The plurality of grids correspond to a plurality of functional units of the at least one query language. The grid set includes at least one of the plurality of grids and corresponds to a functional unit of the plurality of functional units. The at least one resource corresponds to the functional unit and to the grid set. The at least one resource is capable of being used as at least one argument for the grid set.

According to the method and system disclosed herein, the present invention provides a query builder that can be employed by a user having a limited knowledge of the semantics of the query language(s). Thus, the query builder is simpler to use, more flexible, and can be utilized in building complex queries.

DETAILED DESCRIPTION OF THE INVENTION

The present invention relates to computer systems. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method and system for providing a query builder for at least one query language. The method and system comprise providing a plurality of grids and at least one resource for a grid set including at least one of the plurality of grids. The plurality of grids correspond to a plurality of functional units of the at least one query language.

The grid set corresponds to a functional unit of the plurality of functional units. The at least one resource corresponds to the functional unit and to the grid set. The at least one resource is capable of being used as at least one argument for the grid set.

The present invention will be described in terms of particular query languages and particular functional units. However, one of ordinary skill in the art will readily recognize that the method and system are consistent with the use of other query languages and defining other functional units.

Figure 1:
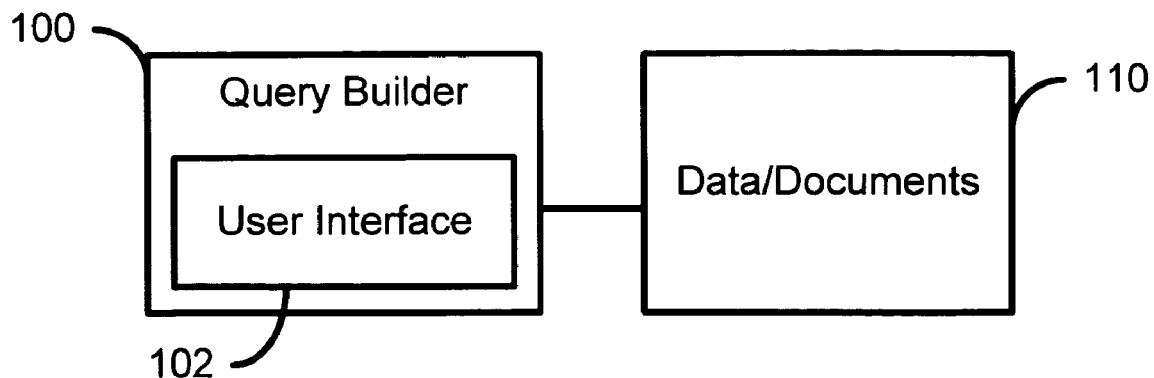
FIG. 1 is a high-level diagram of one embodiment of a query builder in accordance with the present invention.

To more particularly describe the method and system in accordance with the present invention, refer to FIG. 1 depicting a high-level diagram of one embodiment of a query builder 100 in accordance with the present invention. The query builder 100 is used in conjunction with the data 110. Stated differently, queries created with the query builder 100 may be used to interrogate the data 110. The query builder 100 includes a user interface 102 used to aid the user in creating the query. In particular, the user interface 102 of the query builder 100 presents information to the user in a neutral manner that is based upon functional units, rather than only on the entire query. A functional unit is associated with a particular operation and is generally a portion of the query. Examples of functional units include statements such as if-then-else, return, and for statements. In a preferred embodiment, the user interface 102 presents output to and receives input from the user utilizing grids that are divided into grid sets, each of which corresponds to a particular functional unit.

Figure 2:
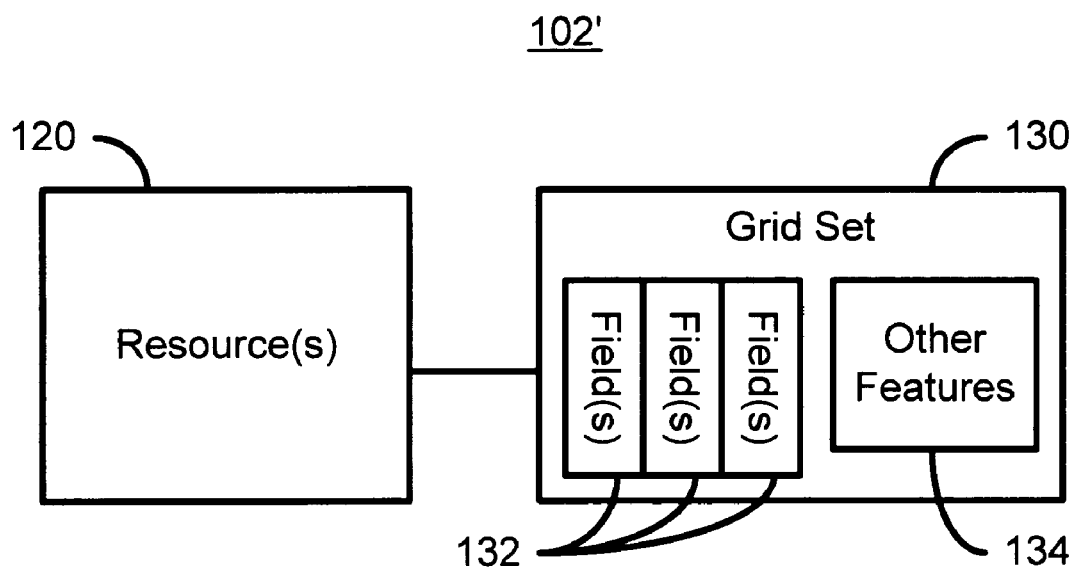
FIG. 2 is a more detailed diagram of one embodiment of a query builder in accordance with the present invention.

FIG. 2 is a more detailed diagram of one embodiment of a query builder in accordance with the present invention for formulating queries in one or more query languages. In particular, one embodiment of the user interface 102' is depicted. In a preferred embodiment, the query language is XQUERY. However, another query language, including but not limited to SQL might also be used in some embodiments. The user interface 102' of the query builder includes grids that are divided into grid sets. One grid set 130 is depicted in FIG. 2. Each grid set 130 corresponds to a particular functional unit and includes at least one grid. For example, for XQUERY, the grid set 130 might correspond to if-then-else statements, FLWOR statements, other available functions, resource properties which allows properties of resources to be defined, variable definition, return statements, for statements, and/or other conditional statements. Each grid in the grid set 130 preferably includes one or more fields 132 in which the user enters information. The fields provided in the grid set 130 depend upon the functional unit to which the grid set 130 corresponds. Thus, the number of fields, the arguments allowed in a particular field, and the portion of the functional unit represented by each field depend upon the functional unit. In a preferred embodiment, the fields correspond to columns, rows, and/or cells of the grids in the grid set 130. Furthermore, the grid set 130 preferably includes other features 134, such as drop down lists and other options that also depend upon the functional unit corresponding to the grid 130.

The user interface 102' also includes resource(s) 120. The resources 120 presented by the user interface 102' depend upon the grid set 130 and, therefore, the functional unit to which the grid set 130 corresponds. For example, the resource(s) 120 might include data types, documents, and/or functional units which depend upon the functional unit corresponding to the grid set 130. The resource(s) 120 are used in conjunction with the grid set 130. In a preferred embodiment, the resource(s) 120 can be selected by the user and dragged and dropped into fields of the grid set 130.

Figure 3:
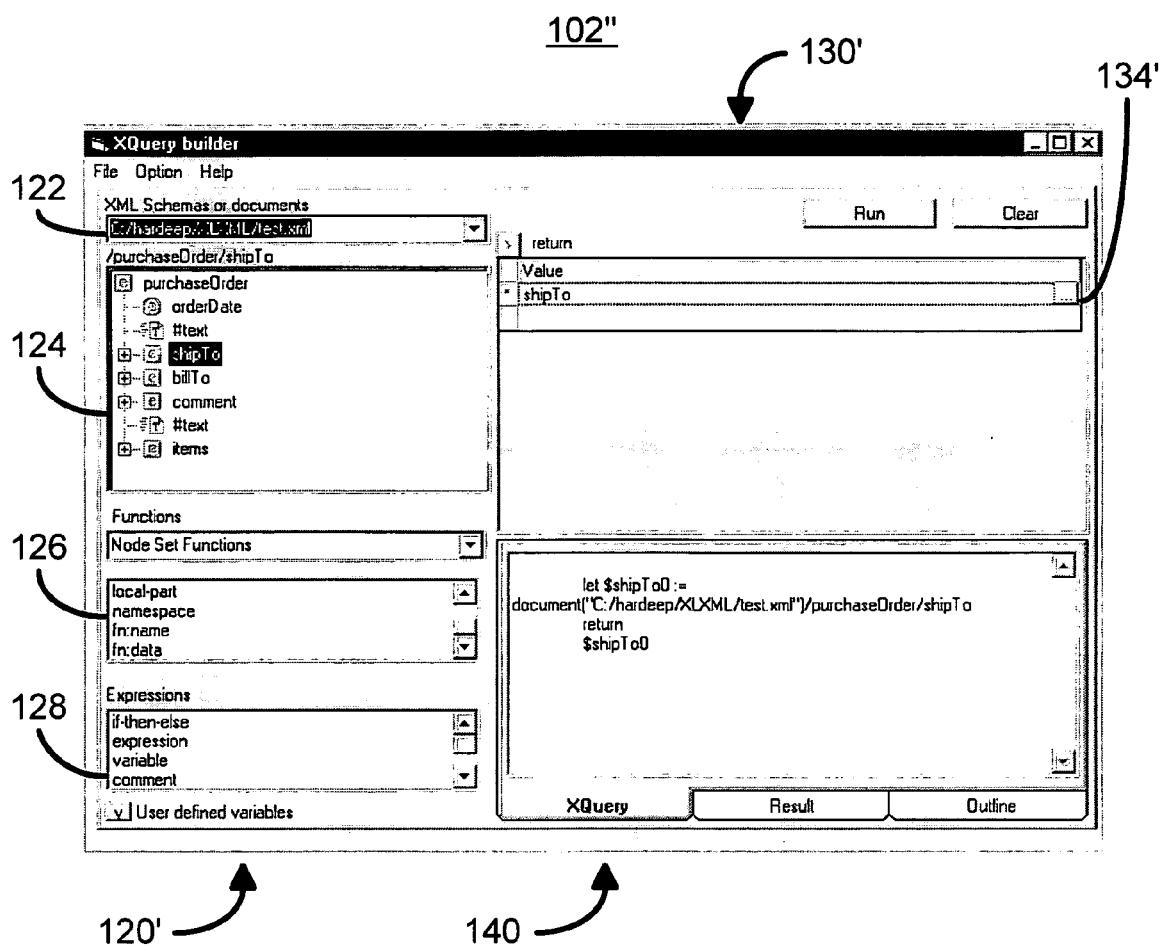
FIG. 3 is a representation of one embodiment of a user interface for a query builder in accordance with the present invention.

FIG. 3 is a representation of one embodiment of the user interface 102" of a query builder in accordance with the present invention. The user interface 102" is depicted as being used for the query language XQUERY. However, nothing prevents the use of an analogous user interface for another query language. In addition, the query being built relates to purchase order information. However, nothing prevents the user interface 102" from being used to interrogate other information. In addition, the user interface 102" shown is for a particular functional unit, a return that requests particular information to be returned. Thus, the functional unit to which the grid set 130' corresponds is a return. As a result, the grid set 130' includes only a single grid having a single field. One other feature 134' depicted is a button allowing the user to drill down into the grid set 130'. Thus, the user is able to expose other grid sets (not shown) and their corresponding functional units related to the query being built. In addition, the user interface 102" includes a window 140 depicting the query being generated by the user. Thus, the window 140 displays the code corresponding to the query formulated using the grid set 130' and resources 120'. The resources 120' correspond to the grid set 130' and the functional unit, the return. Thus, the resources include XML schemas or documents 122, nodes 124, functions 126, and other functional units 128 that are related to the grid set 130" and the functional unit, a return.

Figure 4:
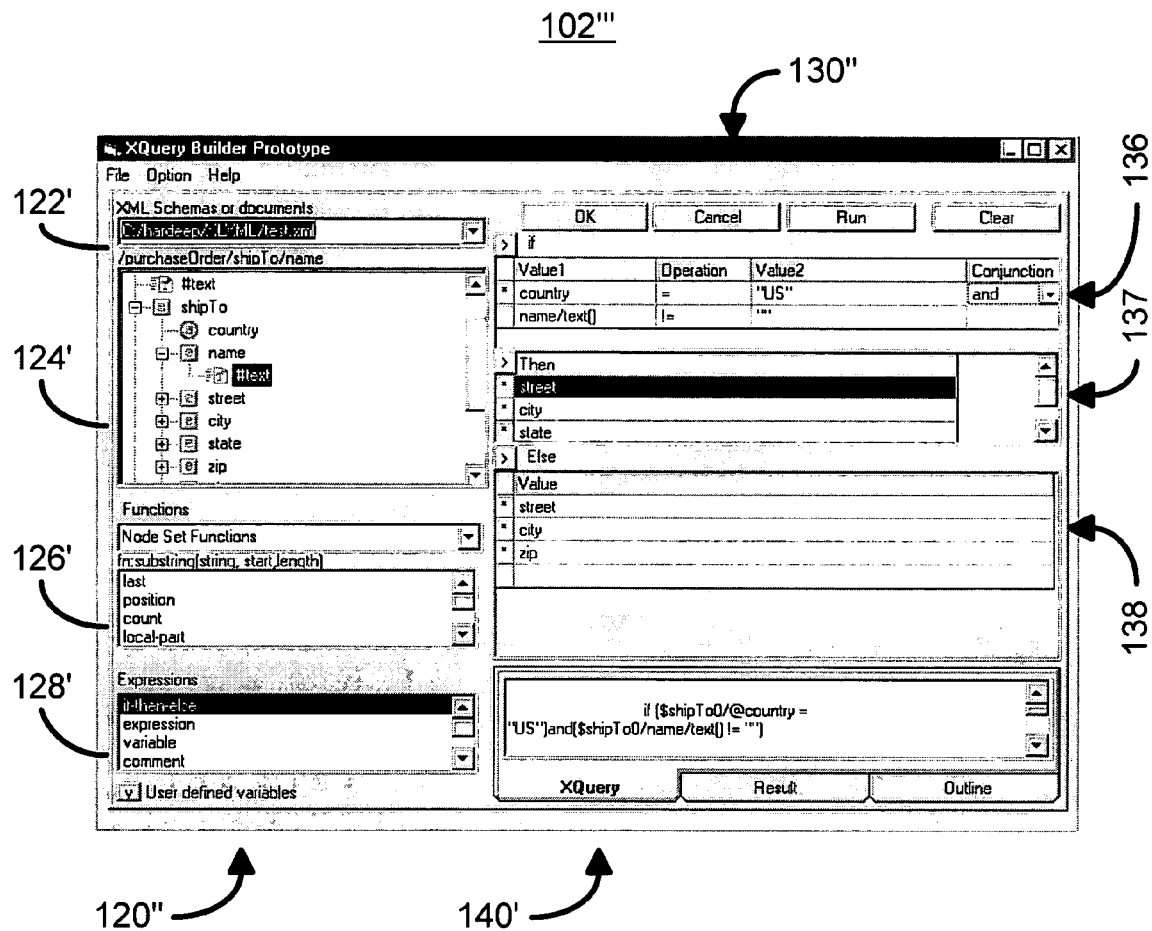
FIG. 4 is a representation of another user interface for a query builder in accordance with the present invention.

FIG. 4 is a representation of another user interface 102''' for a query builder in accordance with the present invention. The user interface 102''' is depicted as being used for the query language XQUERY. However, nothing prevents the use of an analogous user interface for another query language. Portions of the user interface 102''' correspond to the user interface 102" and are, therefore, labeled similarly. For example, the resources 120" include the resources include XML schemas or documents 122', nodes 124', functions 126', and other functional units 128' that are related to the grid set 130" and the functional unit, an if-then-else statement. However, note that the functional unit corresponding to the grid set 130" and, therefore, the resources 120", is different than that shown in FIG. 3. Moreover, the grid set 130" includes multiple grids. Referring back to FIG. 4, because the corresponding functional unit is an if-then-else statement, there are another number of grids 136, 137, and 138 for the grid set 130". In particular, note that windows for the if, then and else fields of the if-then-else statement are provided in the grid set 130" and each correspond to a grid. Furthermore, each grid 136, 137, and 138 has a different set of fields. The if grid 136 has four fields, the then grid 137 and the else grid 138 each have a single field. Thus, the fields (e.g. columns, rows) and grids 136, 137, and 138 of the grid set 130" are unique to the particular functional unit corresponding to the query builder. In addition, the resources 120" displayed may differ from those shown in FIG. 3. Further, the code for the query being built using the user interface 102''' is depicted in window 140'.

Through the use of the grid set 130, 130', or 130" and the resource(s) 120, 120' or 120", a user can more easily build complex queries. Further, this is possible without the user having an in-depth knowledge of the semantics of the query language being used. Because the grid set 130/130'/130" and resource(s) 120/120'/120" depend upon the functional unit being represented, only valid options may be presented. Stated differently, valid resource(s), including other functional units, drop down lists or other features of the grid set 130/130'/130" and resource(s) 120/120'/120", that are available depend upon the functional unit corresponding to the grid 130/130'/130" and resource(s) 120/120'/120". Consequently, a user is automatically guided to make valid selections in using the functional units and building the query. The query builder including the grid set 130/130'/130" and resources 120/120'/120" thus may hide the semantics and syntax of the language in which the query is being formulated, but allow the user to understand and view the logic and flow of the query.

Figure 5:
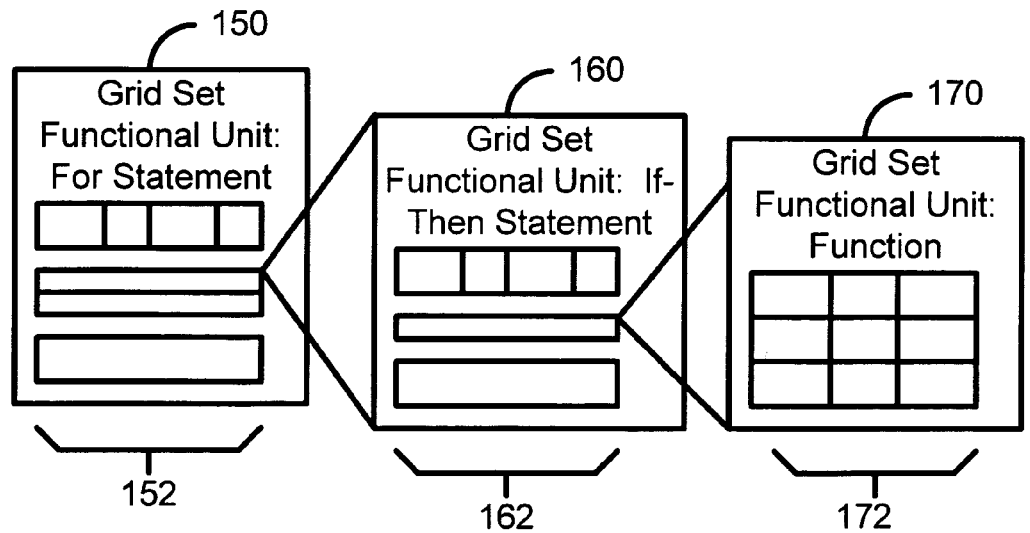
FIG. 5 is a diagram depicting the relationship between particular grid sets for one embodiment of a query builder in accordance with the present invention.

FIG. 5 is a diagram depicting the relationship between particular grid sets 150, 160, and 170 for one embodiment of a query builder in accordance with the present invention. The grid sets 150, 160, and 170 are specific examples of the grid set 130/130'. Consequently, the grid sets 150, 160, and 170 share the properties of the grid set 130/130'. Thus, grid sets 150, 160, and 170 each correspond to functional units being used in formulating a query. In the embodiment shown, the grid sets 150, 160, and 170 correspond to the following functional units: a for statement, an if-then-else statement, and a function, respectively. Consequently, the grids 152, 162, and 172 for the grid sets 150, 160, and 170, respectively, depend upon the corresponding functional units. Moreover, the fields (not explicitly labeled) of the grids 152, 162, and 172 depend upon the corresponding functional units and the individual grids 152, 162, and 172. Further, the functional units for the grids 160 and 170 are used as arguments for specific ones of the fields in the grids 152 and 162, respectively, of the grid sets 150 and 160, respectively. Consequently, when viewing a particular one of the gird sets 150, 160, and 170, a user is allowed to add to the query by adding other operations corresponding to other functional units. Thus, the user is allowed to drill down from one grid set 150 to other grid sets 160 and 170 corresponding to other functional units. The grid sets 150, 160, and 170 are related in that the corresponding functional units are being used to formulate a query. In addition, the functional unit corresponding to the grid sets 160 and 170 are valid and usable as arguments for the grid sets 150 and 160, respectively. Thus, using the grid sets 150, 160, and 170, a complex query having multiple functional units corresponding to the grid sets 150, 160, and 170 can be built without the user having detailed knowledge of the semantics and syntax of the query language.

Figure 6:
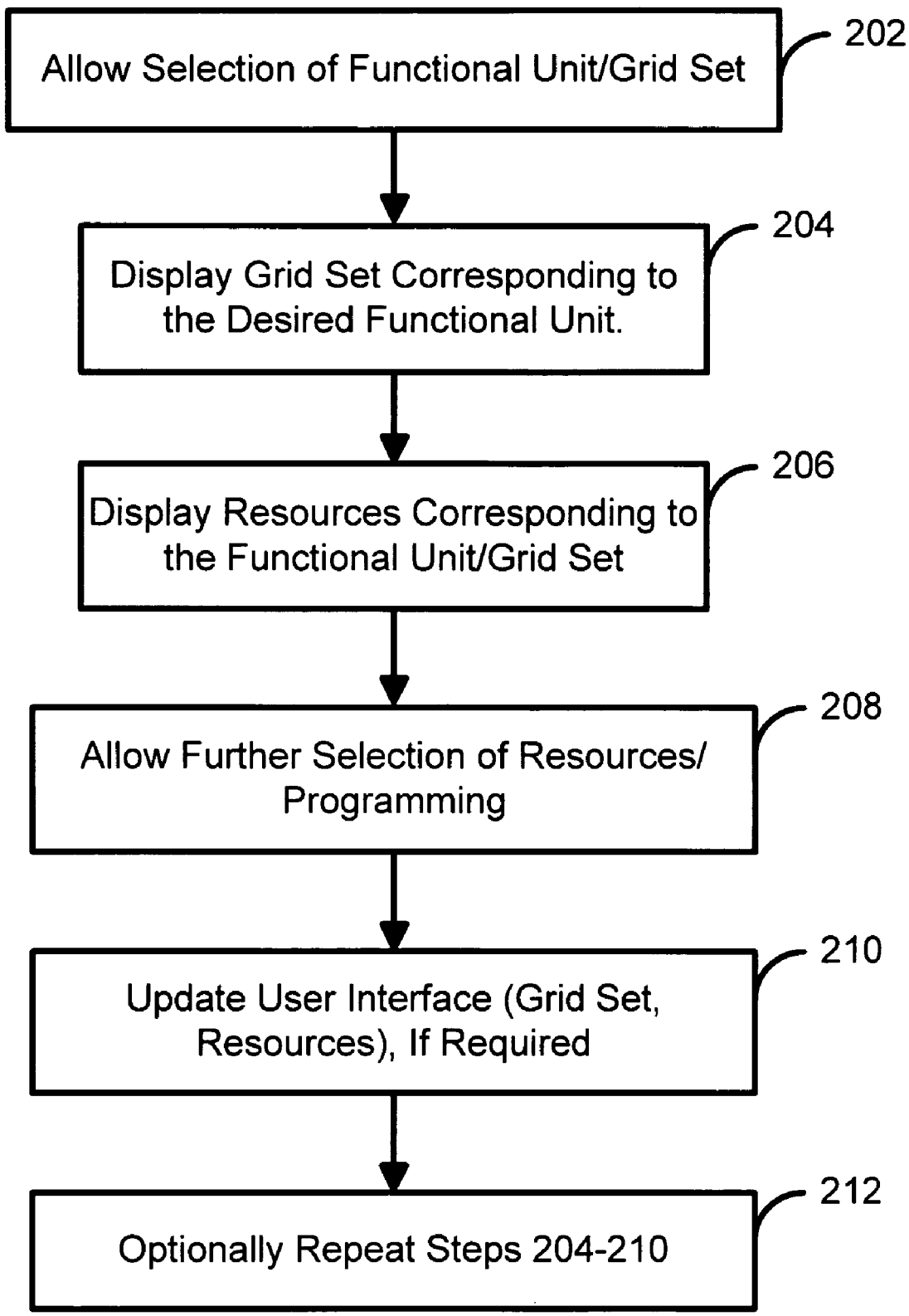
FIG. 6 is a flow chart depicting one embodiment of a method in accordance with the present invention for building a query.

FIG. 6 is a flow chart depicting one embodiment of a method 200 in accordance with the present invention for building a query. The method 200 is preferably used in conjunction with the user interface 102, 102', and/or 102", grid sets 130, 130', 130", 150, 160, and 170, and the query builder 100. However, nothing prevents the use of other query builders not inconsistent with the present invention. The method 200 preferably commences after the query builder 100 has been initialized.

The selection of a functional unit, and thus its corresponding grid set is allowed, via step 202. A user can thus decide which functional unit to include in the query to appropriately interrogate the desired data. The grid set corresponding to the functional unit is displayed in response to the selection, via step 204. In addition to displaying the grid set, the resources corresponding to the grid set and functional unit are displayed, via step 206. Note that the resources, grid(s) in the grid set, fields of the grids in the grid set, drop down lists and other items provided to the user are preconfigured and depend upon the functional unit and/or resource. These other items are also displayed in steps 204 and 206. Through steps 204 and 206, a context sensitive, semantics insensitive user interface is displayed. Thus, a user should have sufficient information presented in a neutral manner to continue formulation of a complex query employing the user interface.

The user is allowed to select one or more resources for the grid set, via step 208. A user can select other functional units and drill down to other grid sets, using step 208. Thus, through step 208, a user can provide the information for the particular functional unit and query. The grid set and/or resources are updated based on the user's selections, via step 210. Step 210 might include displaying a new grid set for new functional units selected, depicting the resources in the appropriate fields, updating the code corresponding to the query that is shown to the user. Thus, a user can track his or her progress in formulating the complex query. Steps 204 through 210 are optionally repeated based upon a user's selection.

Thus, using the method 200, and preferably the query builder 100 having the user interface 102, 102', and/or 102", complex queries can be built without significant knowledge of the semantics of the query language.

A method and system for providing a query builder has been disclosed. The present invention has been described in accordance with the embodiments shown, and one of ordinary skill in the art will readily recognize that there could be variations to the embodiments, and any variations would be within the spirit and scope of the present invention. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Accordingly, many modifications may be made by one of ordinary skill in the art without departing from the spirit and scope of the appended claims.

We claim:

1. A computer implemented method for generating queries in a query language, the method comprising:

a computer displaying a graphical user interface (GUI);

receiving a user selection in the GUI selecting one of a plurality of functional units of the query language displayed in the GUI, the plurality of functional units being statements and comprising an if-then-else statement, a for statement, and a return statement;

displaying in the GUI a plurality of resources relating to the selected functional unit, the plurality of resources displayed being limited to those that are valid for use with the selected functional unit, the plurality of resources comprising one or more schemas or documents to query, one or more nodes of each schema or document, one or more functions, and one or more related functional units, the one or more related functional units comprising one or more of a variable, an expression, a comment, an if-then-else statement, a for statement, and a return statement;

receiving a user selection of at least one of the displayed resources;

displaying in the QUI a predefined grid set corresponding to and valid for use with the selected functional unit, the grid set being also based on at least one of the selected resources, the grid set comprising one or more fields, each field in the grid set representing a portion of the functional unit and requiring information to be inputted to enable the functional unit to operate in the query, the grid set corresponding to the selected functional unit being different from a grid set corresponding to another of the plurality of functional units;

receiving a user input in the QUI for each field in the grid set, the user input for each field in the grid set inputting at least one of the plurality of resources into the field as an argument for the field;

generating a query in the query language based on the selected functional unit, the grid set corresponding to the selected functional unit, and the user input for each field in the grid set, wherein the query, and a semantics and a syntax of the query, are determined and generated automatically without requiring the user to input the semantics, the syntax, or text characters; and displaying the generated query, wherein the query language is XQUERY, and wherein the one or more schemas or documents are XML schemas or documents, the one or more functions are XML functions, and the functional units are XML functional units, and wherein the QUI includes a window displaying the set of resources, the set of resources including a hierarchical set of resources and oaths inside a data tree which includes the hierarchical set of resources, the hierarchical set of resources being limited to those that are valid for use with the selected functional unit, wherein user input can select one or more resources from the hierarchical set of resources.

2. The method of claim 1, wherein the user input for each field in the grid set involves dragging and dropping at least one of the plurality of resources into each field in the grid set.

3. The method of claim 1, wherein the query language is SQL.

4. The method of claim 1, wherein the grid set further comprises one or more features, each feature in the grid set being one of a drop down list and a drill down button.

5. The method of claim 1, wherein each field in the grid set is one of a column, a row, and a cell.

6. The method of claim 1, wherein responsive to a related functional unit that is one of the plurality of functional units of the query language and being inputted as an argument for at least one field in the grid set corresponding to the selected functional unit, generation of the query is further based on the related functional unit, a grid set corresponding to the related functional unit, and a user input for each field in the grid set corresponding to the related functional unit.

7. The method of claim 1, wherein the one or more related functional units only include one or more of an if-then-else statement, a for statement, and a return statement.

8. The method of claim 1, wherein the user selection is a first user selection, the functional unit is a first functional unit, and the grid set is a first grid set, and further comprising:

receiving a second user selection selecting a second one of the plurality of functional units of the query language, wherein the second functional unit corresponds to a second grid set comprising one or more fields, and;

displaying the second grid set, wherein the second functional unit is valid for use with the first grid set and is used as an argument for at least one of the one or more fields of the first grid set.

9. The method of claim 8, wherein the second user selection is received by a displayed drill down button to cause a drilling down from the first grid set to the second grid set and the display of the second grid set.

10. The method of claim 8 wherein the first grid set and the plurality of resources are displayed in a first window, and wherein the second grid set and the second plurality of resources are displayed in a second window different from the first window.

11. The method of claim 1 wherein the selected resource is an XML document representing a predefined hierarchy.

12. The method of claim 1 wherein the selected resource is a node in an XML document representing a predefined hierarchy.

13. The method of claim 12 further comprising drilling down into the node using a drill down button to display an additional grid set including at least one field, the at least one field of the additional grid set based on an additional functional unit and at least one of the plurality of resources selected by the user.

14. The method of claim 1 wherein the GUI displays a drill down button associated with at least one of the fields of the grid set, and in response to receiving a selection of the drill down button, drilling into a selected resource that has been input in the associated field and displaying a second grid set having one or more fields that are based on a second selected functional unit and the selected resource.

* * * * *